United States Patent [19]

Nobe et al.

[11] Patent Number: 5,424,951
[45] Date of Patent: Jun. 13, 1995

[54] ON-BOARD NAVIGATION APPARATUS HAVING USER REGISTERING FUNCTION

[75] Inventors: Kenichi Nobe; Morio Araki; Takeharu Arakawa, all of Kawagoe, Japan

[73] Assignee: Pioneer Electronic Corporation, Tokyo, Japan

[21] Appl. No.: 858,852

[22] Filed: Mar. 27, 1992

[30] Foreign Application Priority Data

Apr. 12, 1991 [JP] Japan ................................. 3-079884

[51] Int. Cl.$^6$ ..................... G06F 165/00; G09B 29/00
[52] U.S. Cl. .................... 364/443; 73/178 R; 340/995; 342/451
[58] Field of Search ...................... 364/443, 444, 449; 340/988, 995; 73/178 R; 342/450, 451

[56] References Cited

U.S. PATENT DOCUMENTS

| | | | |
|---|---|---|---|
| 4,761,742 | 8/1988 | Hanabusa et al. | 364/443 |
| 4,951,212 | 8/1990 | Kurihara et al. | 364/449 |
| 4,974,170 | 11/1990 | Bouve et al. | 364/444 X |
| 4,996,645 | 2/1991 | Schneyderberg Van Der Zon | 364/449 |
| 5,103,400 | 4/1992 | Yamada et al. | 364/444 |

FOREIGN PATENT DOCUMENTS 63-12096  1/1988  Japan .

OTHER PUBLICATIONS

VNIS '89 Conference Record, Sep. 11-13, 1989, Toronto, Canada, D. L. Frank, "Information Systems: An Integral Part of Future Vehicles", pages 85-88.

VNIS '89 Conference Record, Sep. 11-13, 1989, Toronto, Canada, T. Saito et al. "Automobile Navigation System Using Beacon Information" pp. 139-145.

*Primary Examiner*—Kevin J. Teska
*Assistant Examiner*—Collin W. Park
*Attorney, Agent, or Firm*—Sughrue, Mion, Zinn, Macpeak & Seas

[57] ABSTRACT

An on-board navigation apparatus in which one of a plurality of service facilities displayed on a display is designated by an operator input, the position coordinate data corresponding to the designated one service facility is registered as a user position into a memory. When the map is displayed on the display, the position coordinate data which has been user position registered is read out from the memory. The position on the map indicated by the position coordinate data is multiplexed onto the map by a predetermined pattern and displayed on the display. The positions of the service facilities such as restaurants, hotels, or the like, which are necessary for each user, consequently, can be easily confirmed on the displayed map.

2 Claims, 4 Drawing Sheets

Fig. 2

| ADDRESS | LONGITUDE AND LATITUDE DATA | POSITION DISPLAY PATTERN DATA |
|---|---|---|
| A1 | $(x_1, y_1)$ | D1 |
| A2 | | |
| A3 | | |
| A4 | | |
| ⋮ | ⋮ | ⋮ |

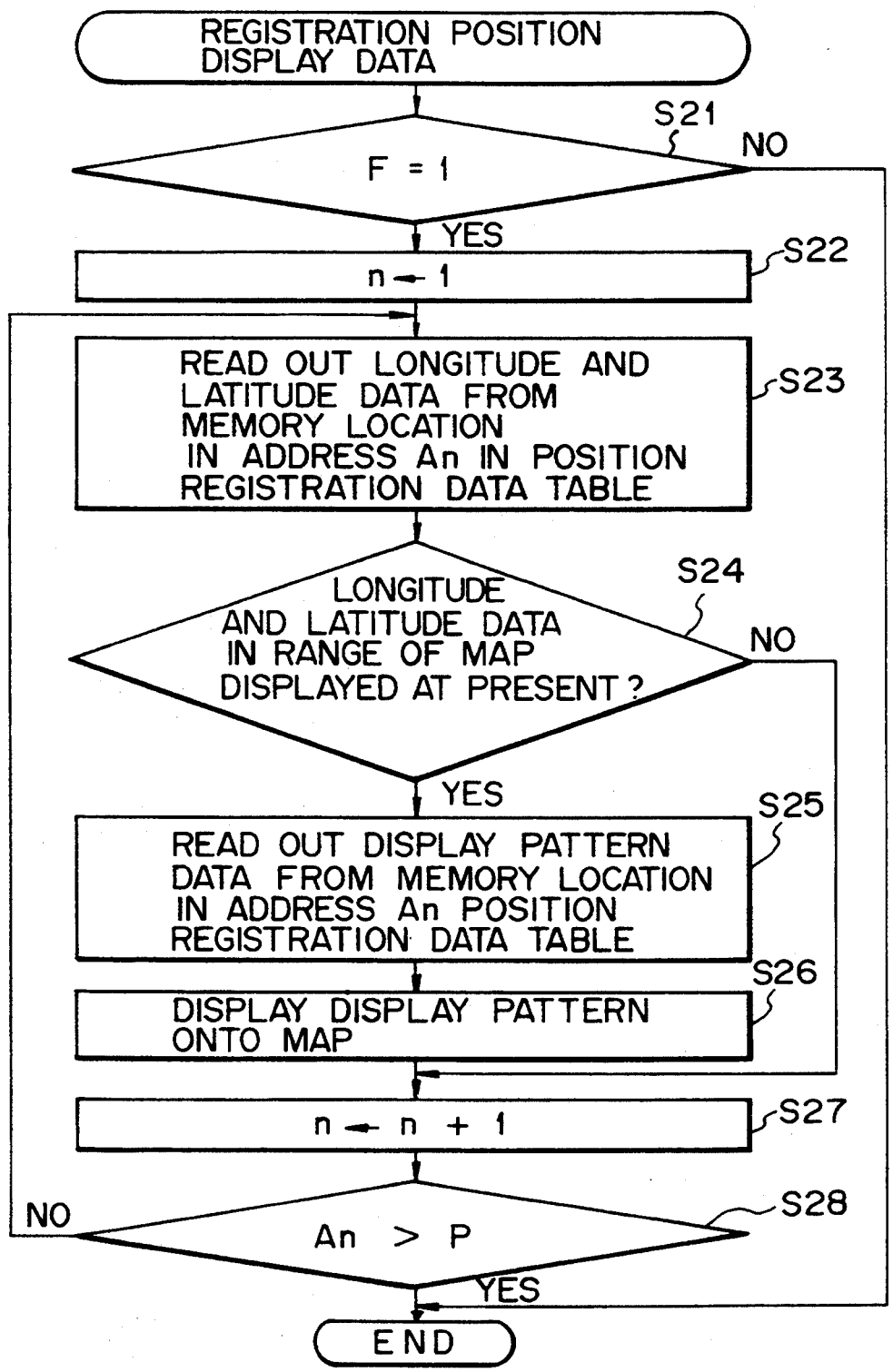

ON-BOARD NAVIGATION APPARATUS HAVING USER REGISTERING FUNCTION

BACKGROUND OF THE INVENTION

1. Field of the Invention

The invention relates to an on-board navigation apparatus which displays a map necessary for the run of the vehicle by a display.

2. Description of the Related Art

There is an on-board navigation apparatus in which map data including road data which is obtained by converting each point on the roads of a map into numerical values is stored in a memory medium such as a CD-ROM or the like. A group of map data of a district of a predetermined range including the present location is read out from the memory medium while recognizing the present location of the vehicle and is displayed on a display as a map around the present location of the vehicle, and the self vehicle position indicative of the present location of the vehicle is automatically displayed on the map. Such an on-board navigation apparatus has been disclosed in, for instance, Japanese Provisional Patent Publication No. 63-12096 and has already been well known.

Such an on-board navigation apparatus has not only the function to display the map around the present location of the vehicle but also the user registering function such that the existing positions which are necessary for each user among service amenities such as restaurants, hotels, and the like existing in the district shown in the map are displayed as patterns on the map. According to the user registering function, a desired position is designated as a user position on the map by the key operation of the user. The longitude data and latitude data of the designated user position are obtained from the map data. The display pattern of such a position is selected by the user. The longitude and latitude data and the display pattern data are stored in a memory. When the map is displayed on the display screen, the longitude and latitude data and display pattern data existing in the range of the map are read out from the memory. The display pattern indicative of the restaurant or the like is displayed at the position indicated by the longitude and latitude data.

In the conventional on-board navigation apparatus, however, in order to use the user registering function, the user activates the service mode and selects necessary one of the service facilities which are displayed on the display screen in the service mode and memorizes the position of the necessary service facility on the map. After completion of the service mode, the user can register such a position only by searching and designating the position from the navigation map. Very complicated operations, consequently, are needed for such a registration.

SUMMARY OF THE INVENTION

It is an object of the invention to provide an on-board navigation apparatus which can register a user position without performing complicated operations.

According to the invention, there is provided an on-board navigation apparatus for displaying a map on a display, comprising: first memory means in which display data indicative of a plurality of service facilities and position coordinate data indicative of existing positions of the service facilities have previously been stored; means for reading out the display data from the first memory means and for displaying the plurality of service facilities onto the display in accordance with the read display data; means for selectively designating one of the plurality of service facilities displayed on the display in accordance with an operator input; means for reading out the position coordinate data corresponding to the designated one service facility from the first memory means; second memory means for storing the read position coordinate data; means for reading out the stored position coordinate data from the second memory means when a map is displayed on the display; and means for multiplexing the position indicated by the read position coordinate data from the second memory means onto the map by a predetermined pattern in order to display on the display.

In the on-board navigation apparatus of the invention, the display data indicative of a plurality of service facilities and the position coordinate data indicative of the existing positions of the service facilities are previously stored in the first memory means. By merely designating one of the plurality of service facilities displayed on the display by the operation, the position coordinate data corresponding to the designated one service facility is read out from the first memory means and the user position is registered into the second memory means. When the map is displayed on the display, therefore, the position coordinate data whose user position has been registered is read out and the position on the map indicative of the position coordinate data is multiplexed onto the map by a predetermined pattern and can be displayed on the display.

BRIEF DESCRIPTION OF THE DRAWINGS

FIG. 2 is a diagram showing a position registration data table;

FIG. 4 is a flowchart showing a registration position display routine.

DETAILED DESCRIPTION OF PREFERRED EMBODIMENT

Figure 1:
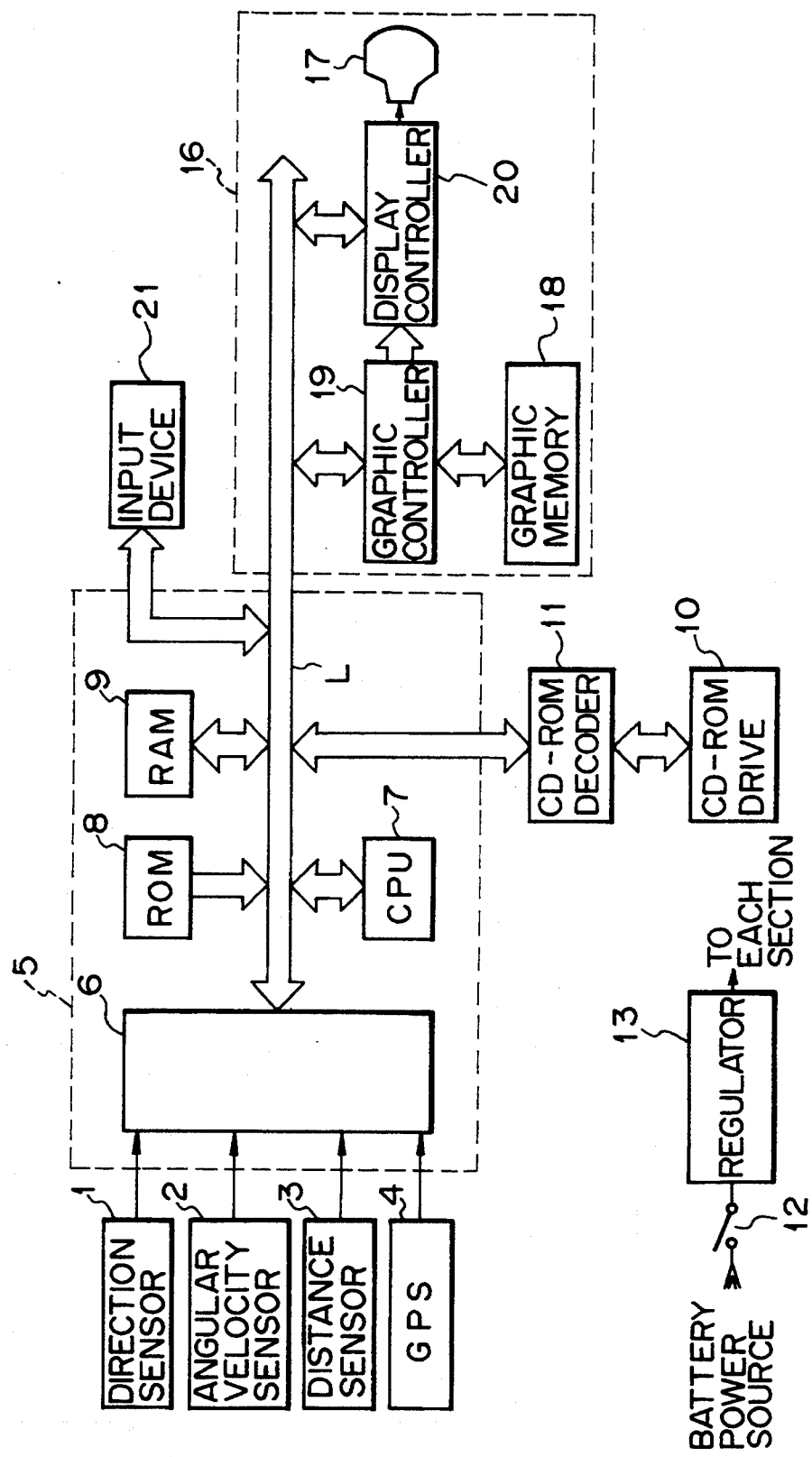
FIG. 1 is a block diagram showing an embodiment of the invention.

FIG. 1 is a block diagram showing an embodiment of an on-board navigation apparatus according to the invention. In the on-board navigation apparatus, a direction sensor 1 detects the running direction of the vehicle, an angular velocity sensor 2 detects an angular velocity of the vehicle, and a distance sensor 3 detects a running distance of the vehicle. A GPS (Global Positioning System) 4 detects the absolute position of the vehicle from longitude and latitude information or the like. Detection outputs of those sensors 1 to 3 and the GPS 4 are supplied to a system controller 5. As the direction sensor 1, for instance, a geomagnetism sensor to detect a running direction of the vehicle by earth magnetism (earth is magnetic field) can be used. The distance sensor 3 comprises a pulse generator which generates a pulse every rotation of a predetermined angle of a drive shaft (not shown) of the vehicle. The pulse generator magnetically or optically detects a rotational angle position of the drive shaft and generates a pulse and is well known.

The system controller 5 comprises: an interface 6 which receives the detection outputs of the sensors (system) 1 to 4 and executes processes such as A/D (analog to digital) conversion and the like; a CPU (central processing unit) 7 for executing various image data processes and for calculating the running distance, running direction, present location coordinates (longitude, latitude), and the like of the vehicle on the basis of the output data of the sensors (system) 1 to 4 which are sequentially sent from the interface 6; a ROM (read only memory) 8 in which various kinds of processing programs of the CPU 7 and other necessary information have previously been written; and an RAM (random access memory) 9 into/from which information necessary to execute the programs is written and read out. The RAM 9 is backed up by being supplied with a voltage in which an output voltage of a battery (not shown) is regulated even when a power source of the navigation system is shut out so as not to extinguish the data such as longitude and latitude data, position display pattern data, position registration flag, and the like, which will be explained later. A position registration data table in which a plurality of longitude and latitude data and the position display pattern data are stored as a pair every address is formed in the RAM 9 as shown in FIG. 2. The position registration data table uses areas from an address $A_1$ in the RAM 9.

For instance, a CD-ROM is used as an external memory medium and is a non-volatile read only memory medium. The external memory medium is not limited to the CD-ROM but can also use a non-volatile memory medium such as a DAT, an IC card, or the like. In addition to the map data which is obtained by converting each point on the roads of the map into digital values (numerical values), service list display data, detailed display data, longitude and latitude data as position coordinate data, and position display pattern data, which will be explained hereinlater, have also previously been stored in the CD-ROM. Memory information in the CD-ROM is read out by a CD-ROM drive 10. A read output of the CD-ROM drive 10 is decoded by a CD-ROM decoder 11 and sent to a bus line L.

A vehicle power source voltage from a battery transmitted through what is called an accessory switch 12 of the vehicle is regulated by a regulator 13 and supplied as a power source of each section in the navigation apparatus. The power source which is supplied to the RAM 9 mentioned above is regulated by another regulator (not shown) different from the regulator 13 without passing through the accessory switch 12.

When the vehicle is running, the CPU 7 calculates the running direction of the vehicle on the basis of the output data of the direction sensor 1 at a predetermined period by a timer interruption. The CPU 7 also obtains the longitude and latitude data as coordinate data of the present location of the vehicle from the running distance and the running direction by the interruption of every run of a predetermined distance based on the output data of the distance sensor 3. The CPU 7 collects the map data of the district of a predetermined range including the present position coordinates from the CD-ROM and temporarily stores the collected data into the RAM 9 and also supplies to a display apparatus 16.

The display apparatus 16 is constructed by: a display 17 such as a CRT or the like; a graphic memory 18 comprising a V (Video)-RAM or the like; a graphic controller 19 for drawing the map data sent from the system controller 5 as image data into the graphic memory 18 and for generating the image data; and a display controller 20 for controlling so as to display a map on the display 17 in accordance with the image data generated from the graphics controller 19. An input device 21 comprises a keyboard or the like and generates various kinds of commands or the like to the system controller 5 by the key operation of the user. As keys which are used in the above key operations, there are provided a selection key to select items displayed on the display 17, a cancel key to switch the display content on the display 17, a position registration key to store data into the RAM 9 (all of the above keys are not shown), and the like.

Figure 3:
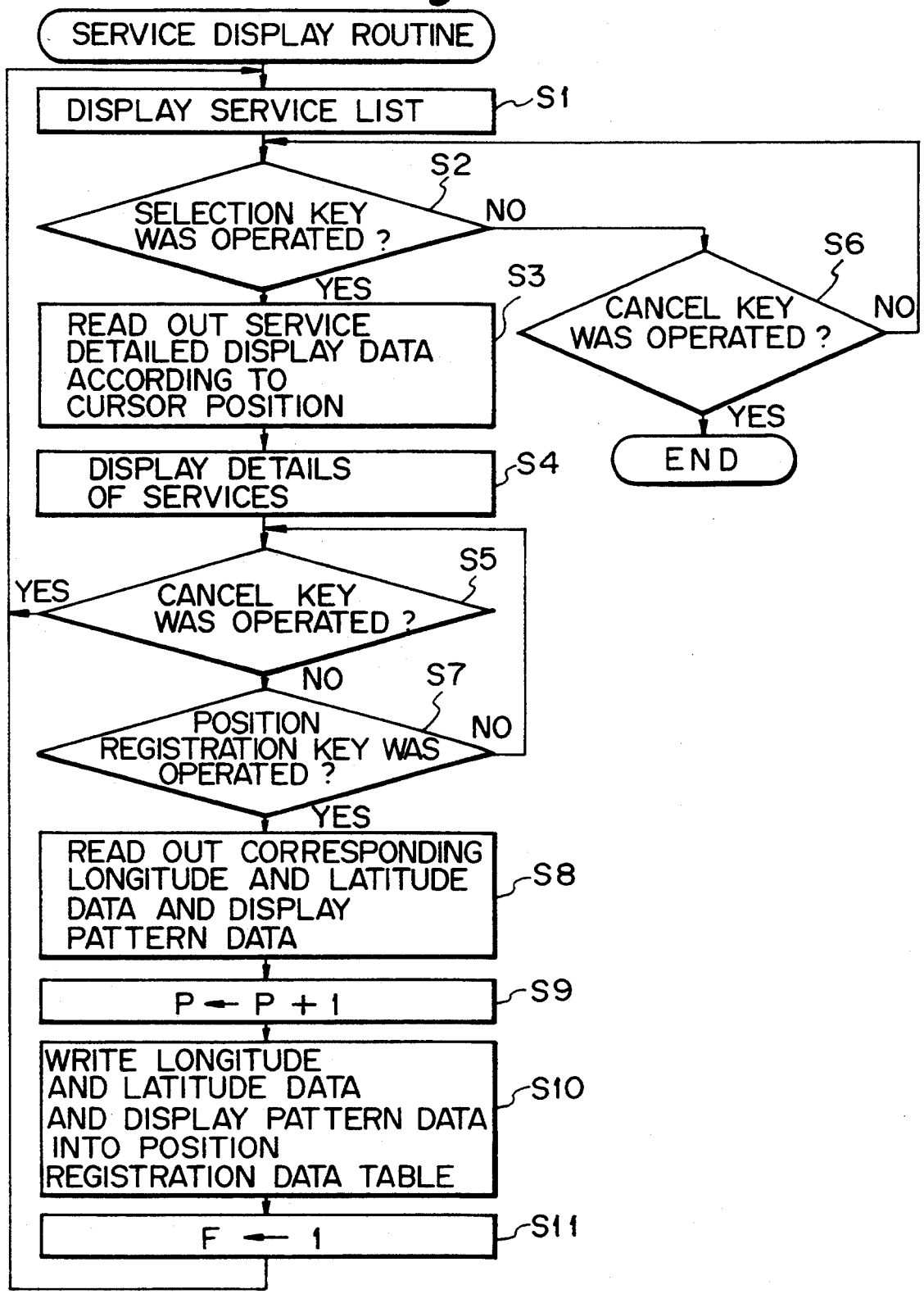
FIG. 3 is a flowchart showing a service display routine.

The user registering operation which is executed by the CPU 7 will now be described in accordance with a service display routine shown as a flowchart in FIG. 3. The service display routine is accessed and executed when the service display menu is selected by the key operation of the user in the input device 21 during the execution of the main routine (not shown) such that a group of map data of the district of a predetermined range including the present location of the vehicle is read out from the CD-ROM while recognizing the present location of the vehicle on the basis of the output data of the sensors 1 and 3 and is displayed on the display 17 as a map around the present location of the vehicle, and the self vehicle position indicative of the present location of the vehicle is displayed on the map, and the like.

In the service display routine, the CPU 7 first displays the service list on the display 17 (step S1). The service list includes restaurants and hotels in each district. The CPU 7 reads out the service list display data recorded in the CD-ROM and supplies to the graphic controller 19 and allows the content in the graphic memory 18 to be rewritten. The service list is, thus, displayed on the display 17. For instance, in the case of the restaurants, the names of the restaurants regarding Japanese cuisine, French cuisine, Chinese cuisine, and the like are displayed on a unit basis of the town or city. In the case where the user wants to know further detailed information (locations, telephone numbers, menu, prices, and the like in the case of the restaurants), therefore, the user moves a cursor by the key operation of the input device 21 and operates the selection key. After execution of step S1, the CPU 7 discriminates whether the selection key has been operated or not (step S2). When the selection key is operated, the CPU 7 gives a command to the CD-ROM drive 10 so as to read out the detailed display data from the CD-ROM in accordance with the cursor position when the selection key has been operated (step S3). For instance, the detailed display data regarding the restaurant selected from the service list is read out from the CD-ROM. The CPU 7 supplies the read-out detailed display data to the graphic controller 19 (step S4). The detailed information of the selected restaurant or the like is displayed on the display 17. After execution of step S4, a check is made to see if the cancel key in the input device 21 has been operated or not (step S5). When the cancel key of the input device 21 is operated, the processing routine is returned to step S1. When the selection key is not operated in step S2 as well, a check is made to see if the cancel key of the input device 2I has been operated or not (step S6). When the cancel key of the input device 21 is operated, the processing routine is finished.

When the cancel key is not operated in step S5, a check is made to see if the position registration key in the input device 21 has been operated or not (step S7). When the position registration key is operated, a command is given to the CD-ROM drive 10 in order to read out the pair of longitude and latitude data and the position display pattern data corresponding to the read detailed display data from the CD-ROM (step S8). "1" is added to the pointer P indicative of the address which has lastly been written (step S9). The read longitude and latitude data and position display pattern data are written as a pair of data at the memory position designated by the pointer P in the position registration data table in the RAM 9 (step S10). "1" is set into a position registration flag F (step S11). The pointer P shows the address of the memory position of the longitude and latitude data and position display pattern data which have lastly been written at the present stage into the position registration data table in the RAM 9. The initial value just after the power source to the RAM 9 was turned on is set to, for example, $A_1$.

As shown in FIG. 2, therefore, in the position registration data table, the longitude and latitude data is written as $(x_1, y_1)$ and the position display pattern data is written as $D_1$ at the memory location in the address $A_1$.

In the above user registering operation, when the position registering key is operated at the stage in which the information is displayed in detail on the display 17, the user position is registered. It is, however, also possible to construct in a manner such that when the position registration key is operated at the stage in which the service list is displayed on the display 17, the user registration for the service facility such as a restaurant or the like at the cursor position is executed.

The operation to display the position registered data on the display 17 which is executed by the CPU 7 will now be described in accordance with a registration position display routine shown as a flowchart in FIG. 4. The registration position display routine is executed as a subroutine in the above main routine.

In the registration position display routine, the CPU 7 first discriminates whether the position registration flag F has been set to 1 or not (step S21). When F=0, this means that the longitude and latitude data and the position display pattern data are not written into the position registration data table in the RAM 9, so that the processing routine is soon finished. When F=1, this means that the longitude and latitude data and the position display pattern data have been written into the position registration data table in the RAM 9, so that a variable n is set to 1 (step S22). The longitude and latitude data $(x_n, y_n)$ is read out from the memory position designated by an address $A_n$ in the position registration data table (step S23). A check is made to see if the longitude and latitude shown by the longitude and latitude data $(x_n, y_n)$ lie within the range of the map displayed at present or not by the processes of the main routine (step S24). In the case of the longitude and latitude data $(x_n, y_n)$ within the range of the map which is at present being displayed, the position display pattern data $D_n$ is read out from the memory position of the address $A_n$ in the position registration data table (step S25). The longitude and latitude data $(x_n, y_n)$ and the position display pattern data $D_n$ are supplied to the graphic controller 19 (step S26). On the display 17, thus, the display pattern shown by the position display pattern data Dn is displayed at the position on the map indicated by the longitude and latitude data $(x_n, y_n)$. For instance, in the case of the restaurant, a display pattern "R", and in the case of the hotel, a display pattern "H" is displayed at the position on the map where such a restaurant or hotel exists.

After execution of the step S26, "1" is added to the variable n (step S27) and a check is made to see if the address $A_n$ is larger than the pointer P or not (step S28). When $A_n > P$, the processing routine is finished. When $A_n \leq P$, step S23 follows and the above operations are executed for all of the data stored in the position registration data table.

In the above embodiment, the restaurants and hotels have been mentioned as service facilities. The invention, however, is not limited to them but can also register, for example, department stores, supermarket stores, schools, and hospitals as service facilities.

In the on-board navigation apparatus of the invention, the display data indicative of a plurality of service facilities and the position coordinate data indicative of the existing positions of the service facilities have previously been stored into the first memory means. By merely designating one of the plurality of service facilities displayed on the display by the key operation, the position coordinate data corresponding to the designated one service facility is read out from the first memory means and the user position is registered into the second memory means. When the map is displayed on the display, accordingly, the position coordinate data whose user position has been registered is read out and the position on the map indicated by the position coordinate data is multiplexed onto the map by a predetermined pattern and can be displayed on the display. The user position can, therefore, be registered by a simple operation, so that the positions of the service facilities such as restaurants or hotels which are necessary for each user can be easily confirmed on the displayed map.

What is claimed is:

1. An on-board navigation apparatus to display a map on a display, comprising:

first memory means for storing display data indicative of a plurality of service facilities, display pattern data indicative of multiple classifications of the respective service facilities, and position coordinate data indicative of existing positions of the service facilities;

means for reading said display data from said first memory means in accordance with an operator input and for displaying said plurality of service facilities onto said display in accordance with the read display data;

means for selectively designating one of said plurality of service facilities displayed on said display in accordance with an operator input;

means for reading the display pattern data and position coordinate data corresponding to the designated one service facility from said first memory means for every time a service facility is designated;

second memory means for storing the read display pattern data and position coordinate data corresponding to all of said display pattern data and said position coordinate data from said first memory means;

means for reading the stored display pattern data and position coordinate data from said second memory means when a map is displayed on said display; and means for multiplexing the position indicated by the read position coordinate data from said second memory means onto the map by a display pattern corresponding to the read display pattern data from said second memory means in order to display on said display.

2. An on-board navigation apparatus according to claim 1, wherein said second memory means has a plurality of memory locations to store said position coordinate data and said position display pattern data to indicate said display pattern as a pair.

* * * * *